No. 706,517. Patented Aug. 12, 1902.
P. BOYD.
APPARATUS FOR WELDING AND TAPERING SOCKETS.
(Application filed Dec. 21, 1901.)
(No Model.) 2 Sheets—Sheet 1.
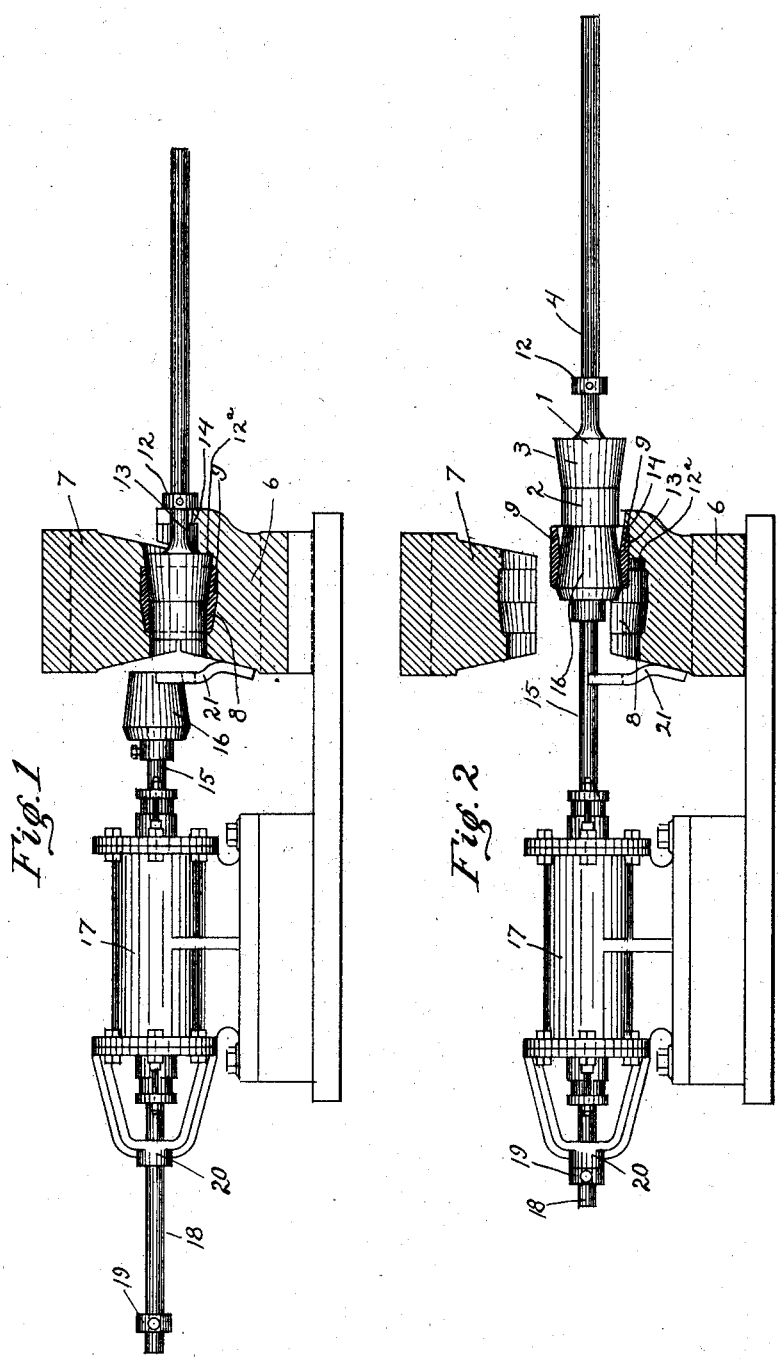
Witnesses.
Inventor.
Peter Boyd
By Kay & Totten
Attorneys.

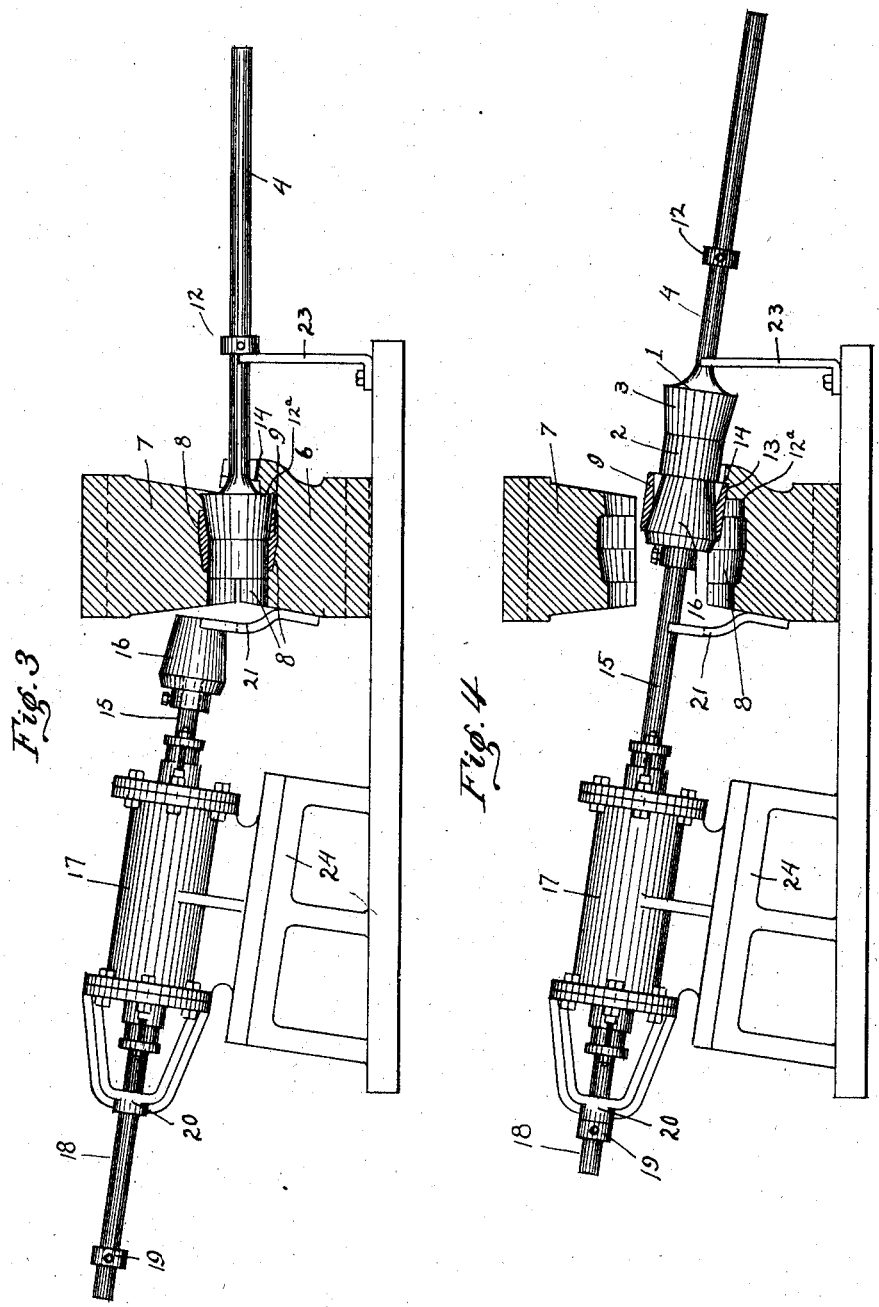

UNITED STATES PATENT OFFICE.

PETER BOYD, OF PITTSBURG, PENNSYLVANIA, ASSIGNOR TO NATIONAL TUBE COMPANY, OF PITTSBURG, PENNSYLVANIA, A CORPORATION OF NEW JERSEY.

APPARATUS FOR WELDING AND TAPERING SOCKETS.

SPECIFICATION forming part of Letters Patent No. 706,517, dated August 12, 1902.

Application filed December 21, 1901. Serial No. 86,766. (No model.)

*To all whom it may concern:*

Be it known that I, PETER BOYD, a resident of Pittsburg, in the county of Allegheny and State of Pennsylvania, have invented a new and useful Improvement in Apparatus for Welding and Tapering Sockets; and I do hereby declare the following to be a full, clear, and exact description thereof.

My invention relates to apparatus for welding, shaping, and tapering pipe couplings or sockets; and its object is to provide apparatus whereby couplings or sockets can be welded, shaped externally, and tapered internally at both ends at a single heat and with a minimum of operations and handlings.

Pipe couplings or sockets are preferably tapered at both ends where the screw-threads are cut, so that when they are screwed onto a pipe they will form a tight joint therewith.
Heretofore it has been the practice to weld and shape such couplings upon a straight mandrel, then strip the same off said mandrel, and, after the coupling had cooled, taper the same internally at both ends by means of a suitably-shaped reaming or tapping tool. It has also been proposed to weld and shape the couplings upon a straight mandrel, as above described, then strip the same off said mandrel, and at the same heat, by means of suitable apparatus or dies, forge or expand the ends of the couplings to produce the internal taper. In all methods of manufacture prior to my invention, however, at least three steps or operations were necessary before the coupling was ready for threading—namely, first, welding and shaping on a straight mandrel; second, stripping the welded and shaped coupling off the mandrel, and, third, either at the same heat forging or expanding the ends of the coupling to form the internal taper or, after the coupling had cooled, reaming out the same internally at both ends. Each additional step or operation in the manufacture of small articles of this character necessitates an additional handling thereof and adds considerably to the cost; but heretofore it has never been found practical to make such couplings with a less number of steps than those enumerated.
It is the object of my invention to provide apparatus for welding and shaping couplings or sockets and tapering the same internally at both ends whereby the number of steps or operations and handlings are reduced and the cost correspondingly reduced.

To this end it comprises a suitable mandrel having, preferably, a straight and a tapered portion, or at least a tapered portion, on which the coupling is welded and shaped, together with suitable dies for welding the coupling around the mandrel, said dies being also provided with an abutment or shoulder against which one of the couplings may rest and in line therewith a power-actuated plunger having a tapered portion and which is adapted to abut against the mandrel, push the latter out of the coupling, and simultaneously expand the smaller end of the coupling and taper it internally.

In the accompanying drawings, Figure 1 is a side view, partly in section, of one form of my apparatus, showing the same in the welding position. Fig. 2 is a similar view showing the same in the stripping position, and Figs. 3 and 4 are corresponding views of a modified form of apparatus.

With my apparatus it is essential to have a mandrel 1, which is preferably provided with a straight portion 2 and a tapered portion 3, but at least with a tapered portion, and which is preferably provided with a handle 4 for manipulating and carrying the same. In conjunction with this mandrel I use suitable welding and shaping dies, such as the anvil-die 6 and the top die 7, both of which are provided with suitably-shaped cavities 8 for welding and shaping the blank 9 about said mandrel to form the coupling, and simultaneously tapering it internally and preferably at one end thereof only.

In the use of this apparatus the blank having been bent into ring form and properly heated is slipped onto the mandrel to such a position that it covers substantially equal portions of the straight and tapered portions of said mandrel. The mandrel and blank are then placed between the dies 6 and 7, and in order to properly position the mandrel in the blank it is desirable to use some stop or gage—such, for instance, as the adjustable collar or shoulder 12 on the handle of the mandrel, which is adapted to abut against the front face of the anvil-die or a suitable bracket secured thereto; or, if desired, the anvil-die may be provided with a shoulder 12ª, against which the end of the mandrel-head may abut. The blank naturally falls into the welding-cavities 8, so that if the mandrel be properly positioned with reference to the dies it will also be properly positioned with reference to the blank. When thus positioned, the upper die 7 is operated in the usual way—as, for instance, by a power-cylinder or other suitable mechanism—and welds the ends of the blank together, shapes the coupling on the outside, and also tapers it internally at one end. During this operation the mandrel is preferably slowly rotated by the handle 4. When the coupling has been properly welded and shaped between the dies 6 and 7, the die 7 is raised and the mandrel and blank are slightly raised and drawn forward until the coupling rests in the stripping-cavity 13, with its forward end abutting against the stripping-shoulder 14. In line with the center of this stripping-cavity is a power-plunger 15, having a tapered head 16, which is adapted to abut against the mandrel, force the same out of the coupling, and then expand the rear end of the coupling and taper it internally, as shown. Any suitable power mechanism may be used for actuating the plunger 15—such, for instance, as the power-cylinder 17. To properly taper the coupling, it is necessary that the plunger enter the same to just the right distance and no farther. Consequently some stop or gage should be employed to limit the forward movement of the plunger. As a convenient means for this purpose I have extended the piston-rod of the cylinder 17 through the rear head thereof, as at 18, and provide the same with the adjustable ring or collar 19, which is adapted to abut against the yoke 20, secured to the power-cylinder or other convenient support, and thus limit the forward movement of the plunger. After the mandrel 1 has been ejected from the coupling and the latter expanded it is liable to stick to the plunger, and as a convenient means for stripping the same therefrom I secure to the anvil-die 6 or other part of the apparatus an arm 21, which is fork-shaped at its upper end to embrace said plunger and which is in such position that as the plunger is withdrawn it will engage with the rear end of the coupling and strip the same from the plunger.

In the form of apparatus shown in Figs. 1 and 2 the power-cylinder 17 and its plunger are horizontal, and the mandrel and coupling must be raised straight upwardly and then moved slightly forward until the coupling rests in the stripping-cavity 13. In the apparatus shown in Figs. 3 and 4 the stripping-cavity 13 is slightly inclined, and in front of the dies is a standard or other suitable support 23, upon the upper end of which the handle 4 of the mandrel is adapted to rest. This support serves as a fulcrum for said handle, so that by bearing down on the outer end of the handle the mandrel, with the coupling thereon, can be raised to the position shown and allowed to move slightly forward until the coupling rests in the stripping-cavity 13. This makes it unnecessary to lift the mandrel and coupling and is especially useful for large-sized couplings, which require a large and heavy mandrel. The collar 12 on the mandrel may be arranged to contact with this support to position the mandrel in the dies. In order that the plunger 15 and power-cylinder 17 may be in line with the axis of the coupling, I have mounted the power-cylinder on an inclined base 24, as shown. By this means the plunger will have a direct action on the mandrel and coupling. In other particulars, however, the apparatus is the same and operates in the same way as that shown in Figs. 1 and 2.

The operation of the apparatus will be understood from the foregoing description, and further description thereof is not deemed necessary. Suffice it to say that the heated blank is shaped and welded on the mandrel 1 between the dies 6 and 7, the operation being the ordinary one of welding between dies on a mandrel. When properly welded and shaped, the top die is moved up out of the way, and the mandrel, with the coupling thereon, is either lifted, as in Figs. 1 and 2, or tilted, as in Figs. 3 and 4, and moved slightly forward until the coupling rests in the stripping-socket 13, with its front end abutting against the shoulder 14. The plunger 15 is then actuated to cause its head to force the mandrel out of the coupling and to expand and taper the interior of the rear end of the coupling, the forward movement of said plunger being limited by the collar 19. When the plunger 15 is retracted, the fork 21 will strip the coupling off the head of the plunger.

I have shown the mandrel provided with a straight as well as a tapered portion; but it would be sufficient if it were tapered throughout. In that case the coupling would be tapered from end to end and the plunger-head 19 when forced into the smaller end thereof would have to expand it to a greater extent than with the shape shown in the drawings. I prefer to use a mandrel with a straight as well as a tapered portion, but wish it understood that my invention is not limited thereto.

It will thus be seen that by means of this apparatus the blank will be welded and shaped into a coupling and tapered on its interior at both ends at a single heat and at substantially a single operation. The coupling is ready for a threading operation as soon as it leaves the stripping-die.

What I claim as my invention, and desire to secure by Letters Patent, is—

1. In apparatus for welding and tapering pipe sockets or couplings, the combination of a mandrel, and a die having a welding-cavity and a stripping-shoulder in front of and above the same.

2. In apparatus for welding and tapering pipe sockets or couplings, the combination with a mandrel, of a die having a welding-cavity and a stripping-shoulder in front of and above the same, and a plunger in line with said shoulder.

3. In apparatus for welding and tapering pipe sockets or couplings, the combination with a mandrel having a tapered portion, of a die having a welding-cavity and a stripping-shoulder in front of and above the same, and a plunger in line with said stripping-shoulder, said plunger having a tapered portion.

4. In apparatus for welding and tapering pipe sockets or couplings, the combination with a mandrel, of a die having a welding-cavity and a stripping-shoulder in front of and above the same, a plunger in line with said stripping-shoulder, and a stripper adjacent to said plunger and to the rear of the stripping-shoulder.

5. In apparatus for welding and tapering pipe sockets or couplings, the combination with a mandrel, of a die having a welding-cavity and a stripping-shoulder in front of and above the same, a plunger in line with said shoulder, and power mechanism for actuating said plunger.

6. In apparatus for welding and tapering pipe sockets or couplings, the combination with a mandrel, of a die having a welding-cavity and a stripping-shoulder in front of and above the same, and a fulcrum-support for the mandrel in front of the die.

7. In apparatus for welding and tapering pipe sockets or couplings, the combination with a mandrel, of a die having a welding-cavity and a stripping-shoulder in front of and above the same, of a fulcrum in front of the die upon which the mandrel rests, and a stripping-plunger in line with the stripping-shoulder, said plunger being inclined to bring it in line with the mandrel.

8. In apparatus for welding and tapering pipe sockets or couplings, the combination with a mandrel, of a die having a welding-cavity and a stripping-shoulder in front of and above the same, a fulcrum-support for the mandrel in front of the die, and a shoulder or collar on the mandrel arranged to engage said support to position the mandrel in the die.

In testimony whereof I, the said PETER BOYD, have hereunto set my hand.

PETER BOYD.

Witnesses:
ROBERT C. TOTTEN,
F. W. WINTER.